United States Patent
Benisty

(10) Patent No.: US 12,436,893 B2
(45) Date of Patent: Oct. 7, 2025

(54) ADDRESS TRANSLATION SERVICE FOR HOST QUEUES

(71) Applicant: Sandisk Technologies, Inc., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/447,813

(22) Filed: Aug. 10, 2023

(65) Prior Publication Data

US 2025/0053516 A1    Feb. 13, 2025

(51) Int. Cl.
  *G06F 12/0891*   (2016.01)
  *G06F 12/10*     (2016.01)

(52) U.S. Cl.
  CPC .......... *G06F 12/0891* (2013.01); *G06F 12/10* (2013.01)

(58) Field of Classification Search
  CPC .............................. G06F 12/0891; G06F 12/10
  See application file for complete search history.

(56) References Cited

U.S. PATENT DOCUMENTS

| | | | |
|---|---|---|---|
| 6,839,777 B1 * | 1/2005 | Vrancic | G06F 13/28 710/52 |
| 7,590,817 B2 * | 9/2009 | Moertl | G06F 12/1081 711/202 |
| 7,617,377 B2 | 11/2009 | Moertl et al. | |
| 9,336,158 B2 | 5/2016 | Manula et al. | |
| 10,387,078 B1 * | 8/2019 | Benisty | G06F 3/0659 |
| 11,422,944 B2 | 8/2022 | Guo et al. | |
| 2018/0321864 A1 * | 11/2018 | Benisty | G06F 3/0634 |
| 2018/0321945 A1 * | 11/2018 | Benisty | G06F 13/00 |
| 2019/0146712 A1 * | 5/2019 | Lee | G06F 12/0246 711/103 |
| 2022/0206976 A1 | 6/2022 | Ng et al. | |
| 2023/0333990 A1 * | 10/2023 | Helmick | G06F 12/1045 |
| 2024/0143508 A1 | 5/2024 | Benisty et al. | |
| 2024/0168891 A1 * | 5/2024 | Sharma | G06F 12/123 |

* cited by examiner

*Primary Examiner* — Ryan Bertram
(74) *Attorney, Agent, or Firm* — Patterson + Sheridan, LLP

(57) ABSTRACT

Instead of using address translation cache (ATC) to translate addresses for host queues, bypass the ATC and directly use translated addresses. When creating the submission queues (SQ) or completion queues (CQ), the controller receives the untranslated addresses from the host, and the device is responsible for translating the untranslated addresses before accessing the host queues. The host queue pointers will directly use the translated addresses while bypassing the ATC. When bypassing the ATC, different flows can be used such as create queue command flow and invalidate operations. In a create queue command flow, the firmware (FW) performs address translation by interacting with a translation agent (TA) to receive the translated addresses. With an invalidate flow, the controller scans all untranslated addresses provided by the host at the queue creation time and compares the untranslated addresses against the invalidated address.

10 Claims, 8 Drawing Sheets

ADDRESS TRANSLATION SERVICE FOR HOST QUEUES

BACKGROUND OF THE DISCLOSURE

Field of the Disclosure

Embodiments of the present disclosure generally relate to improving address translation service (ATS) management for host queue pointers.

Description of the Related Art

One of the use cases of a multi-tenancy device is where the solid state drive (SSD) is shared across multiple tenants (i.e., virtual memory (VM), hosts) without any hypervisor layer between the SSD and host. The device is able to communicate with the hosts, but the device thinks the interaction across an interface is with a single host rather than multiple hosts. There are a variety of optimizations around memory usage that can be done when the host implements page movement capabilities. Page movement utilizes address translation service (ATS) and page request interface (PRI) functionality in any Peripheral Component Interconnect express (PCIe) device that is directly accessed by guest VMs. ATS is when the host interacts with the device with virtual pointers. All the pointers that are provided are host related pointers. The device is not allowed to use the pointers directly. Before the device is able to use the pointers, there needs to be some sort of translation mechanism. Moving memory pages implies the device will receive PCIe addresses that need to be translated.

A translation agent (TA) services memory translation requests. Within the TA, the address translation cache (ATC) is referred to as a translation look-aside buffer (TLB). When the ATS enabled SSD device accesses system memory, the SSD shall cache translated addresses in an ATC. The ATC is differentiated from the TLB translation cache used by the host. The ATS-enabled SSD device shall implement and maintain an internal ATC to minimize performance dependencies on the TA and alleviate TA resource pressure. The ATC feature is very expensive since ATC requires a huge RAM memory to be used as the cache buffer (in the order of up to several MBs), as well as high-performance lookup operations. ATC significantly increases the area, the cost, and the power consumption of the memory device.

Therefore, there is a need in the art for improving ATS management for host queue pointers.

SUMMARY OF THE DISCLOSURE

Instead of using address translation cache (ATC) to translate addresses for host queues, bypass the ATC and directly use translated addresses. When creating the submission queues (SQ) or completion queues (CQ), the controller receives the untranslated addresses from the host, and the device is responsible for translating the untranslated addresses before accessing the host queues. The host queue pointers will directly use the translated addresses while bypassing the ATC. When bypassing the ATC, different flows can be used such as create queue command flow and invalidate operations. In a create queue command flow, the firmware (FW) performs address translation by interacting with a translation agent (TA) to receive the translated addresses. With an invalidate flow, the controller scans all untranslated addresses provided by the host at the queue creation time and compares the untranslated addresses against the invalidated address.

In one embodiment, a data storage device comprises: a memory device; and a controller coupled to the memory device, wherein the controller is configured to: receive a create queue command; fetch queue untranslated address from a host device; perform address translation on the untranslated address to create translated addresses; create a non-contiguous queue using the translated addresses; and send a completion to the host device for the create queue command.

In another embodiment, a data storage device comprises: a memory device; and a controller coupled to the memory device, wherein the controller is configured to: receive an invalidate request; scan and compare all untranslated addresses to an address in the invalidate request; perform address translation on the address in the invalidate request to create a new translated address; and replace an old translated address with the new translated address.

In another embodiment, a data storage device comprises: means to store data; and a controller coupled to the means to store data, wherein the controller is configured to: translate untranslated addresses to create translated addresses, wherein the translated addresses are non-contiguous; search the untranslated addresses for a match in response to an invalidation request; and replace a translated address of the translated addresses with a newly translated address from the invalidation request.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of using address translation cache (ATC) to translate addresses for host queues, bypass the ATC and directly use translated addresses. When creating the submission queues (SQ) or completion queues (CQ), the controller receives the untranslated addresses from the host, and the device is responsible for translating the untranslated addresses before accessing the host queues. The host queue pointers will directly use the translated addresses while bypassing the ATC. When bypassing the ATC, different flows can be used such as create queue command flow and invalidate operations. In a create queue command flow, the firmware (FW) performs address translation by interacting with a translation agent (TA) to receive the translated addresses. With an invalidate flow, the controller scans all untranslated addresses provided by the host at the queue creation time and compares the untranslated addresses against the invalidated address.

Figure 1:
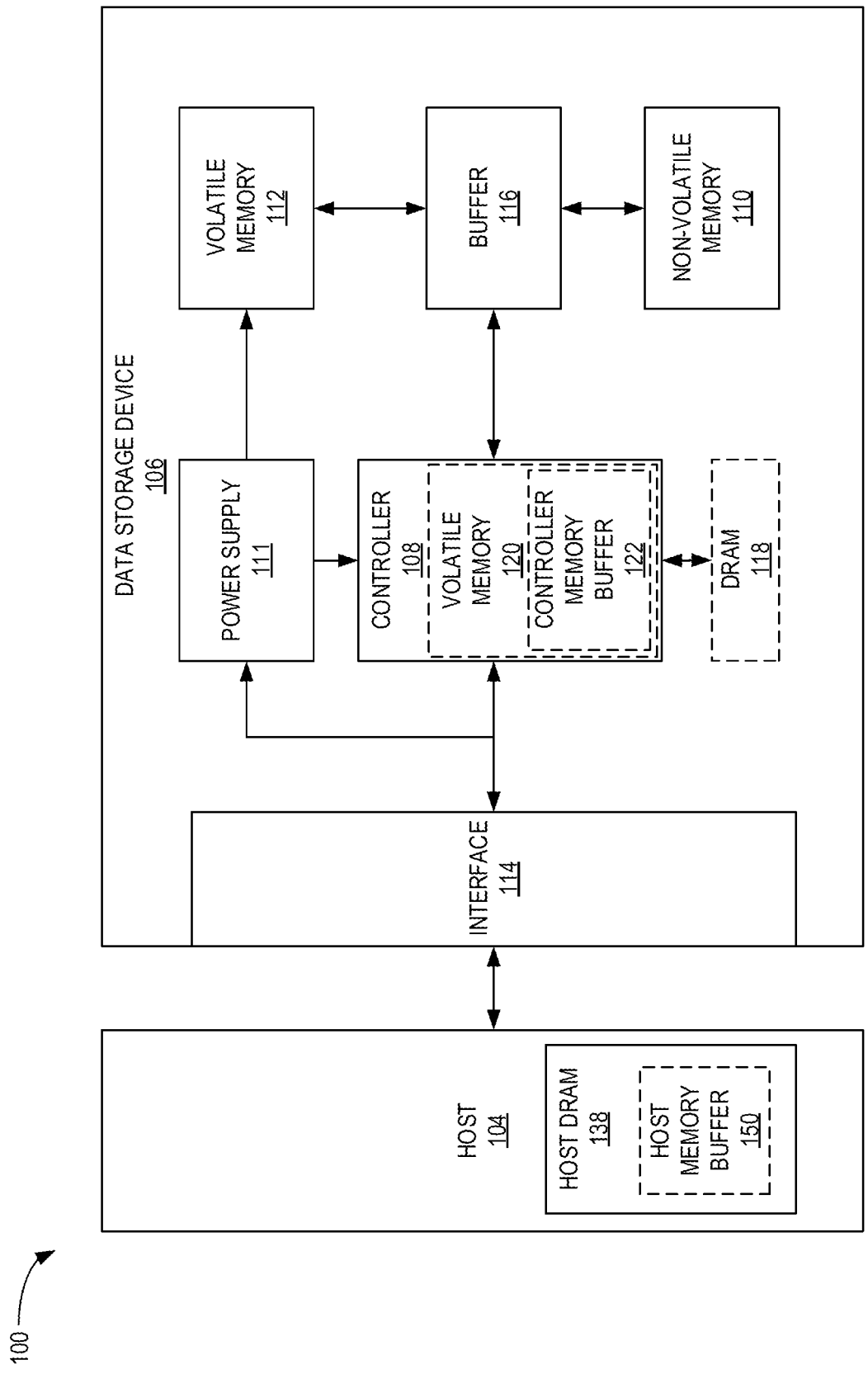
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random-access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
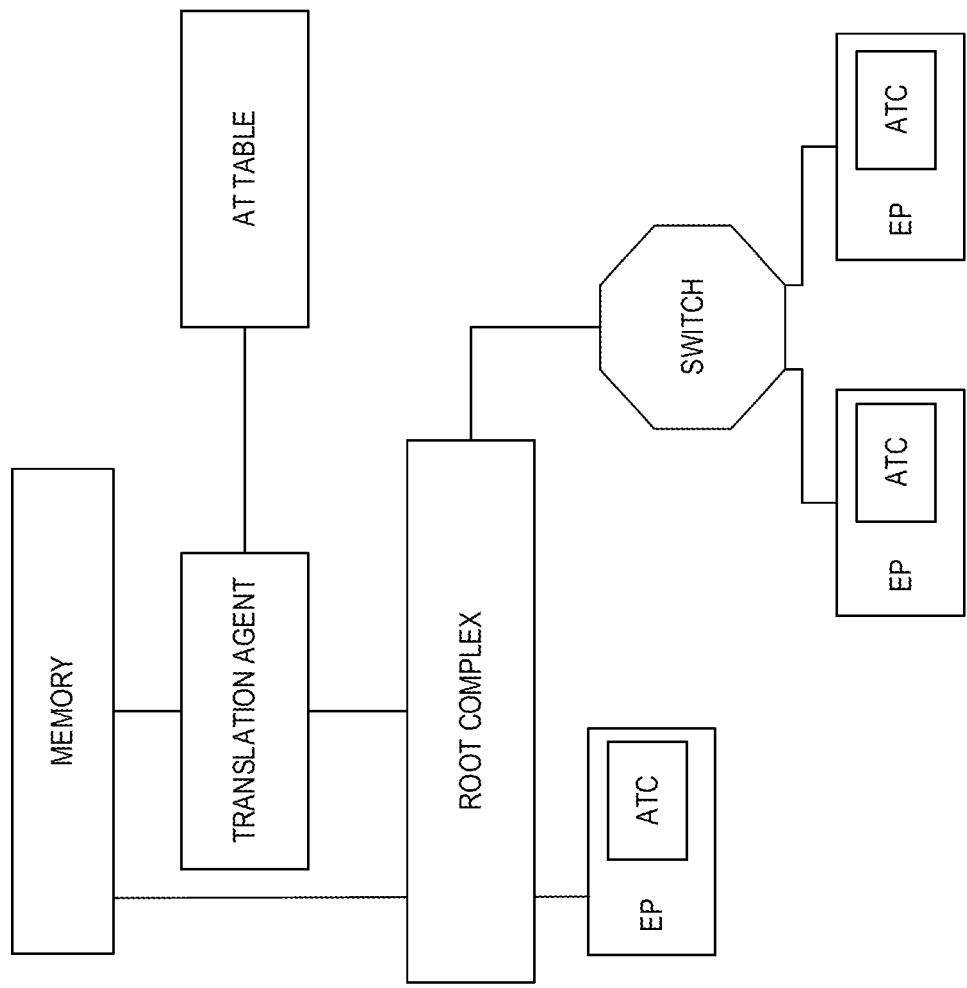
FIG. 2 is a block diagram illustrating a multi-tenancy system supporting ATS/ATC functionality, according to one embodiment.

FIG. 2 is a block diagram illustrating a multi-tenancy system 200 supporting ATS/ATC functionality, according to one embodiment. The endpoints (EP) are the devices that are in the system 200. For example, there is a PCI switch in communication with a root complex and two EP's comprising ATC's. Above the root complex there is a translation agent (TA) in communication with an address translation (AT) table. The TA is responsible for the address translation. The AT table is maintained by the TA, which helps to calculate and to implement the address translation. If the root complex sends a read or write command to the device, the device receives the virtual pointers from the command. The device then takes those virtual pointers. Before using the virtual pointers, the EP truly interacts with the TA in order to receive the physical addresses.

Interacting with the TA adds extra overhead for the command execution and also extra traffic in the fabric. In order to reduce the traffic, the complexity, and the overhead, usually each device implements ATC. The ATC is a small cache table. Before sending a translation request to the translation agent, first the device checks whether the translation is already stored in the cache. If the translation is already stored in the cache, then the device will directly take the relevant physical address from the cache without the interaction with the TA.

The data integrity extension (DIX) requests translations for metadata pointers and the metadata pointers linked lists of addresses. Physical region pages (PRPs) and scatter gather lists (SGLs) decode the data pointers and follow linked lists. The PRPs and SGLs are used for the pointers to read data and write data that is stored in the host DRAM. PRPs and SGLs are also used for interrupts and submission queues (SQ). When the host holds all the commands that are going to be sent to the device, completion queues (CQ) are used by the device in order to tell the host about the completion commands. The addresses are provided by the host at the initialization phase, but also those addresses provided are virtual addresses. Before using the virtual addresses, the device should interact with the TA in order to receive the physical addresses to store in the ATC. The device can support noncontiguous skills.

Figure 3:
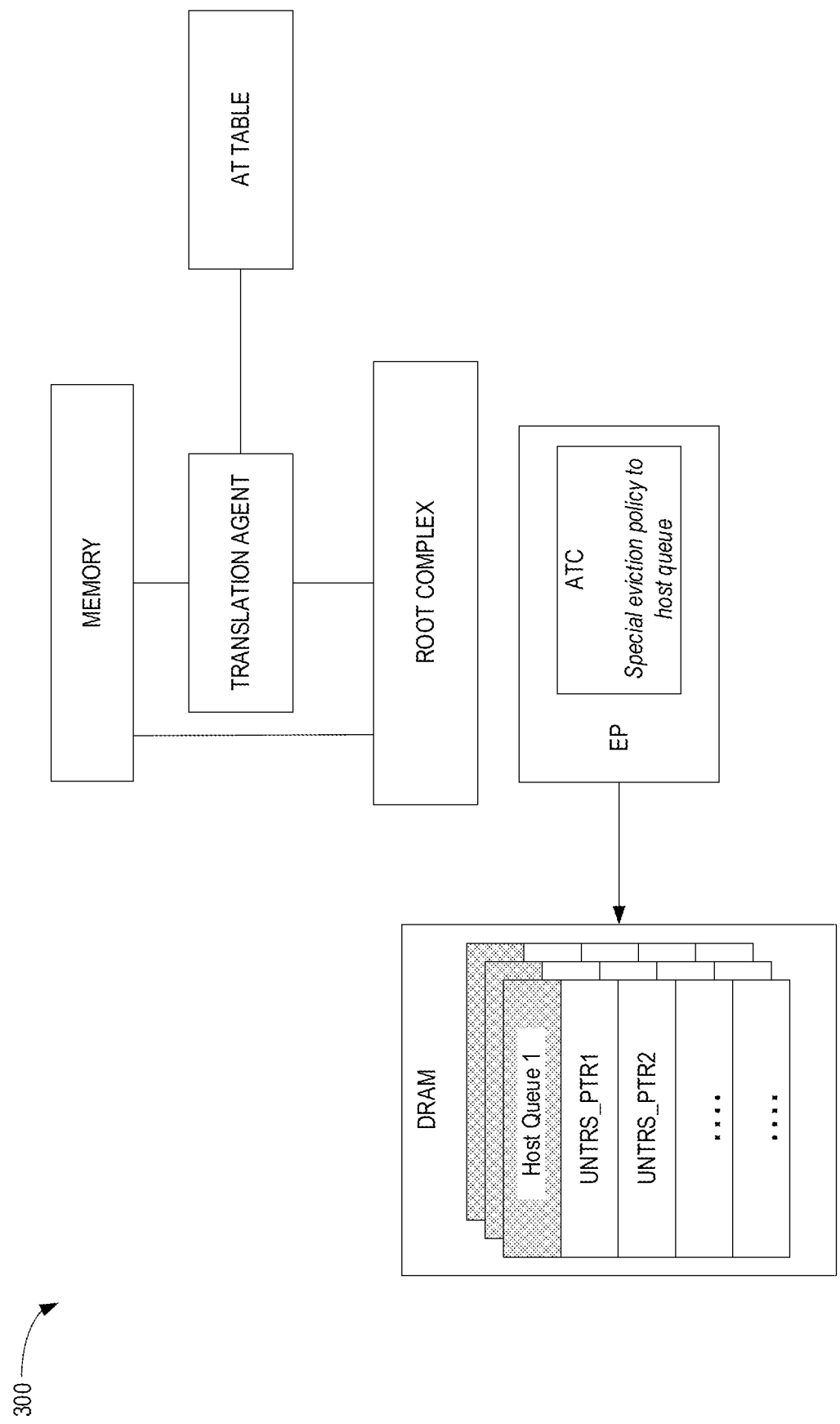
FIG. 3 is a block diagram illustrating a multi-tenancy system for ATS support for host queues, according to one embodiment.

FIG. 3 is a block diagram illustrating a multi-tenancy system 300 for ATS support for host queues, according to one embodiment. The system comprises a memory, a root complex, and an EP. The system 300 further comprises a TA in direct communication with the memory, an AT table, and the root complex. The EP comprise a dedicated ATC. The ATC has a special eviction policy to host queue. The EP is connected to a DRAM, such as DRAM 118 of FIG. 1, comprising a plurality of host queues.

Previously, the ATS solution works for host queues. The controller, such as the controller 108 off FIG. 1, receives untranslated addresses that describe the queues and holds the queues internally (in DRAM in this figure). Whenever command fetching is needed, the untranslated addresses are fetched from the DRAM. The controller then performs lookup operations to find the translated addresses in the ATC of the EP. If the controller finds a match, the translated addresses are taken from ATC to be used. Otherwise, the TA is accessed to receive the translated addresses. With a dedicated ATC in the EP, the ATC has the functionalities of all the ATCs in FIG. 2. All of the most used pointers, virtual pointers, and the relevant physical addresses are stored in the dedicated ATC of the EP for a general solution. A special eviction mechanism is used in the dedicated ATC for the host queue addresses, since the host queues are accessed frequently.

The ATS solution for the other translations can work for host queues, but the problem with this ATS solution is that the ATC should be maintained. To maintain the ATC with the frequent use of the host queues, there would need to be a size increase of the ATC. The ATC size increase with the use of the ATS solution is needed for support, because now the device stores the host queues along with all the pointers.

In normal cases, there are many pointers associated with the host queues and the pointers will consume most of the storage area just for holding those pointers. The ATC will increase the complexity of the search engine because whenever the controller has a pointer, the controller has to scan the ATC in order to find the match. If the controller has more entries in the ATC, then the ATC will add extra complexity and of course power consumption in order to find the match. The added complexity is done for each and every pointer in the system. A different solution for host queues may be better than using the ATS solution approach.

As discussed herein, a new method is proposed for host queue pointer management for ATS systems. The new method is different as the new method defines a unique management for host pointers rather than using a standard solution. The main advantage of the concept is that the concept is more adapted to a host queue. As a result, the concept requires less ATC RAM and simplifies the exception scenario. The host queue pointers will use the translated addresses while bypassing the ATC. The concept requires different flows for create queue and invalidate operations, but the changes are completely transparent to a host device.

Figure 4:
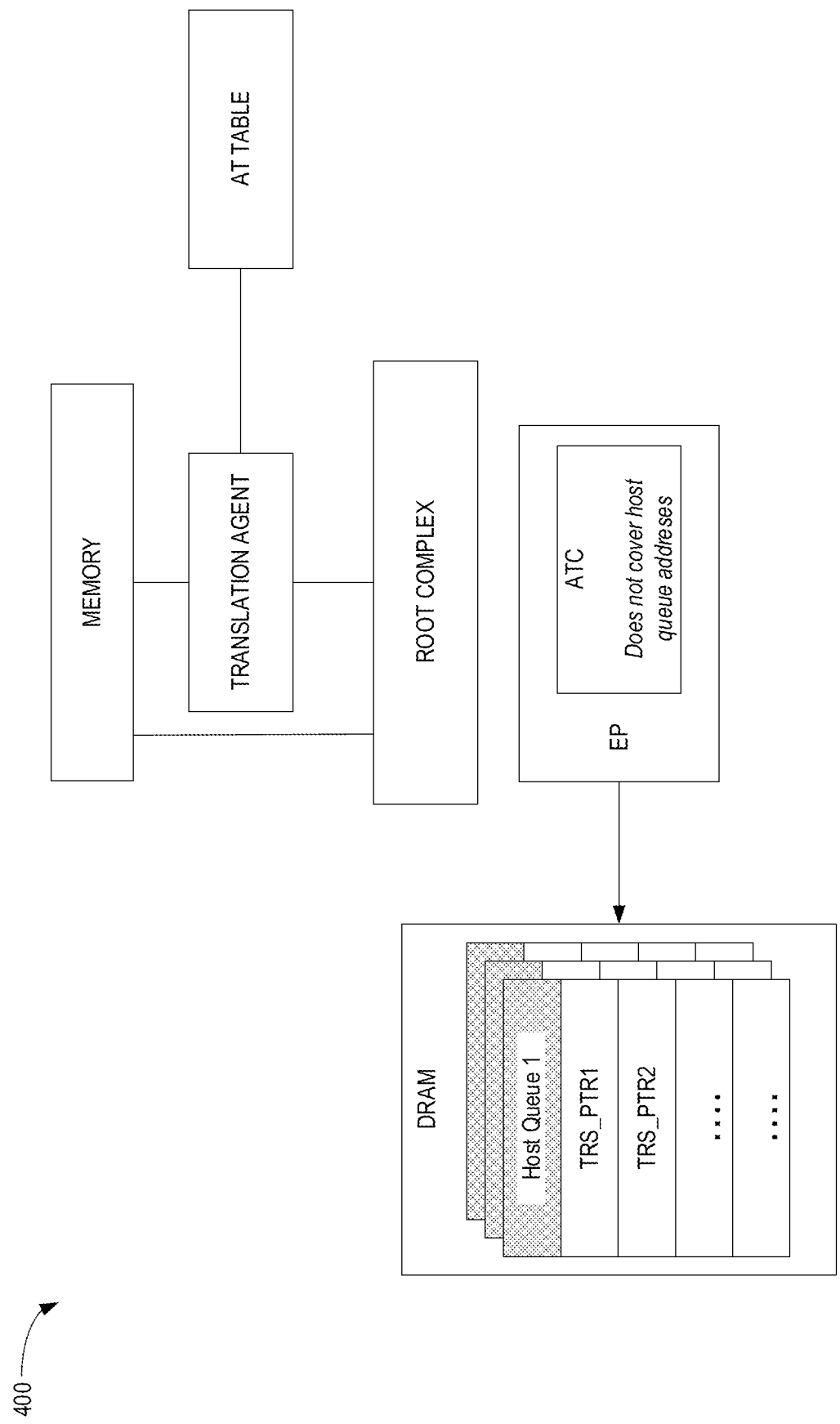
FIG. 4 is a block diagram illustrating a multi-tenancy system for ATS support for host queues, according to one embodiment.

FIG. 4 is a block diagram illustrating a multi-tenancy system 400 for ATS support for host queues, according to one embodiment. The system comprises a memory, a root complex, and an EP. The system 400 further comprises a TA in direct communication with the memory, an AT table, and the root complex. The EP comprises a dedicated ATC. The ATC does not cover host queue addresses. The EP is connected to a DRAM comprising a plurality of host queues. The main difference in this new approach in comparison with the previous ATS solution approach of FIG. 3 is that the host pointers are excluded. The translated addresses are used, opposed to the untranslated addresses (virtual addresses) used by the rest of the system 400. For command fetching (host queue accesses), ATC is disabled as the translated addresses are used directly. The controller will work directly with physical addresses and not virtual addresses.

Figure 5:
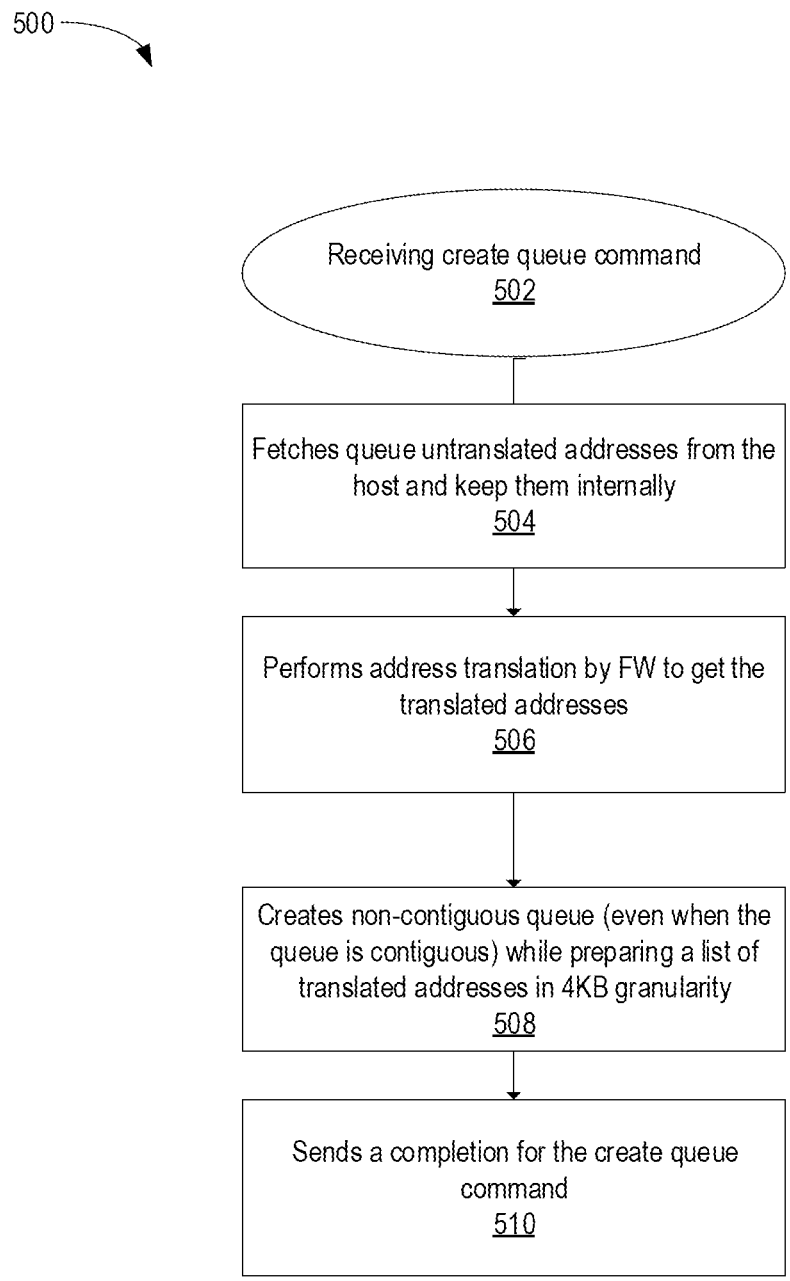
FIG. 5 is a flowchart illustrating a method for creating a queue flow, according to certain embodiments.

FIG. 5 is a flowchart illustrating a method 500 for creating a queue flow, according to certain embodiments. The flow starts by receiving a create queue command. For a noncontiguous queue, the untranslated addresses that describe the queue are fetched by the controller. The FW then performs address translation by interacting with the TA to receive the translated addresses. The non-contiguous queue is created internally, while providing the translated addresses in granularity of 4 KB. Providing the translated addresses in granularity of 4 KB is done even when the queue is a contiguous queue (and even after the address translation) as the contiguous queue simplifies an invalidate flow as later seen in method 600. Finally, a completion is sent to the host for the create queue command. The ATC is bypassed for command fetching, as the queues use the translated addresses rather than the untranslated addresses. The effective size of ATC is now reduced.

The method 500 begins at block 502. At block 502, the controller receives a create queue command. At block 504, the controller fetches queue untranslated addresses from the host and keeps the untranslated addresses internally. The untranslated addresses are equivalent of virtual addresses, and are kept for a while for later use. At block 506, the controller performs address translation by FW to receive the translated addresses. At block 508, the controller creates non-contiguous queue (even when the queue is contiguous) while preparing a list of translated addresses in 4 KB granularity. At block 510, the controller sends a completion for the create queue command.

Figure 6:
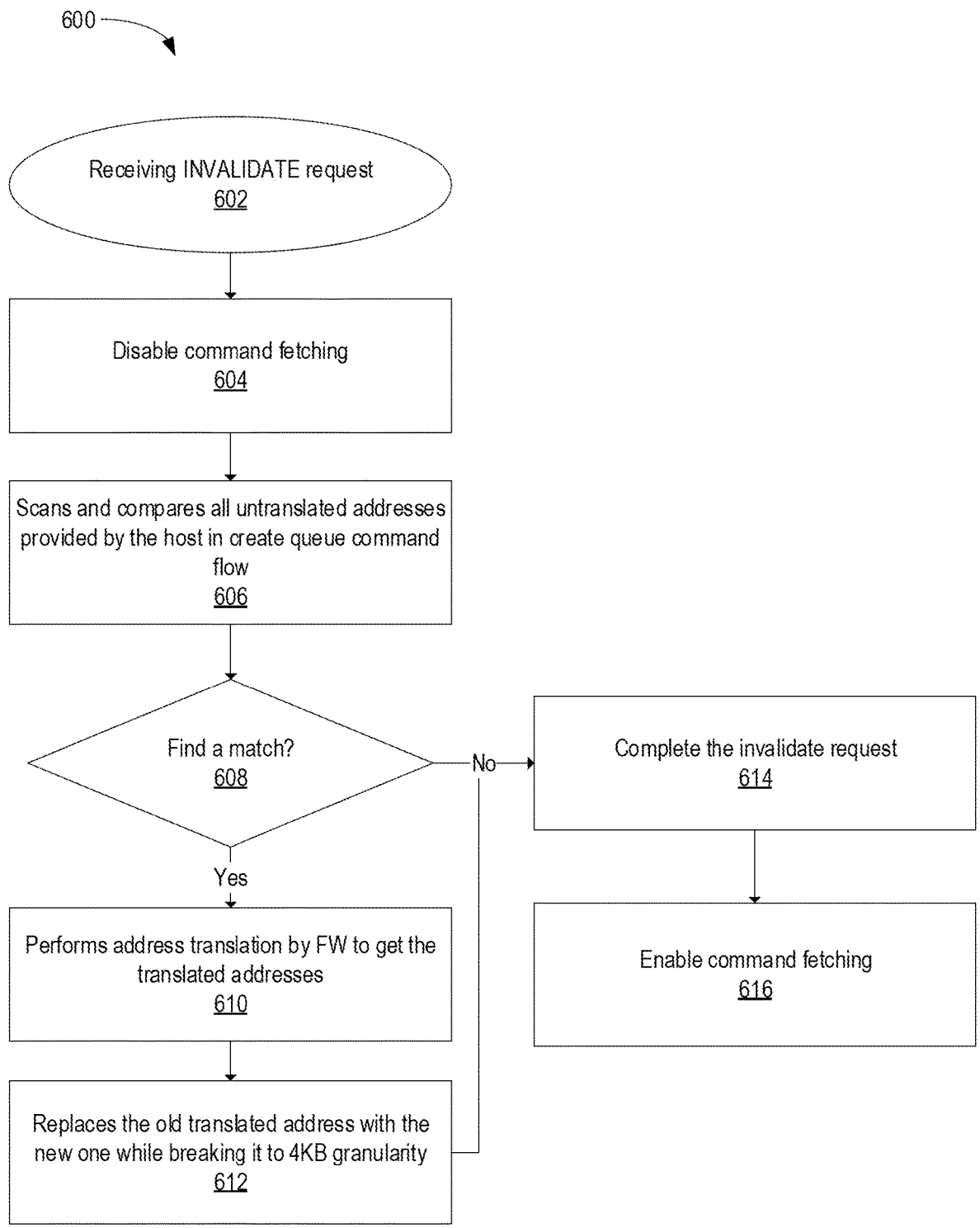
FIG. 6 is a flowchart illustrating a method for creating a invalidate flow, according to certain embodiments.

FIG. 6 is a flowchart illustrating a method 600 for creating a invalidate flow, according to certain embodiments. The flow starts by receiving the invalidate request. The controller disables the command fetching until completing the invalidate flow. The controller scans all untranslated addresses provided by the host at queue command creation time and compares the untranslated addresses against the invalidate address. If a match is not found, then the flow is done by sending a invalidate completion and re-enabling the command fetching.

Otherwise, the FW performs the ATS flow to receive the new translated addresses for the relevant address. The new translated addresses will update the old translated addresses stored in DRAM. The new translated addresses updates the old translated addresses in 4 KB granularity. Finally, the invalidate flow is done by sending invalidate completion and re-enabling the command fetching.

The method 600 begins at block 602. At block 602, the controller receives invalidate request. At block 604, the controller disables command fetching. At block 606, controller scans and compares all untranslated addresses provided by the host in a create queue command flow. At block 608, the controller determines if a match is found.

If the controller determines that a match is found, then the method 600 proceeds to block 610. At block 610, the controller performs address translation by firmware (FW) to receive the translated addresses. At block 612, the controller replaces the old translated address with the new translated address while breaking the new translated address to 4 KB granularity and the method 600 proceeds to block 614. If the controller determines that a match is not found, then the method 600 proceeds to block 614. At block 614, the controller completes the invalidate request. At block 616, the controller enables command fetching.

Figure 7:
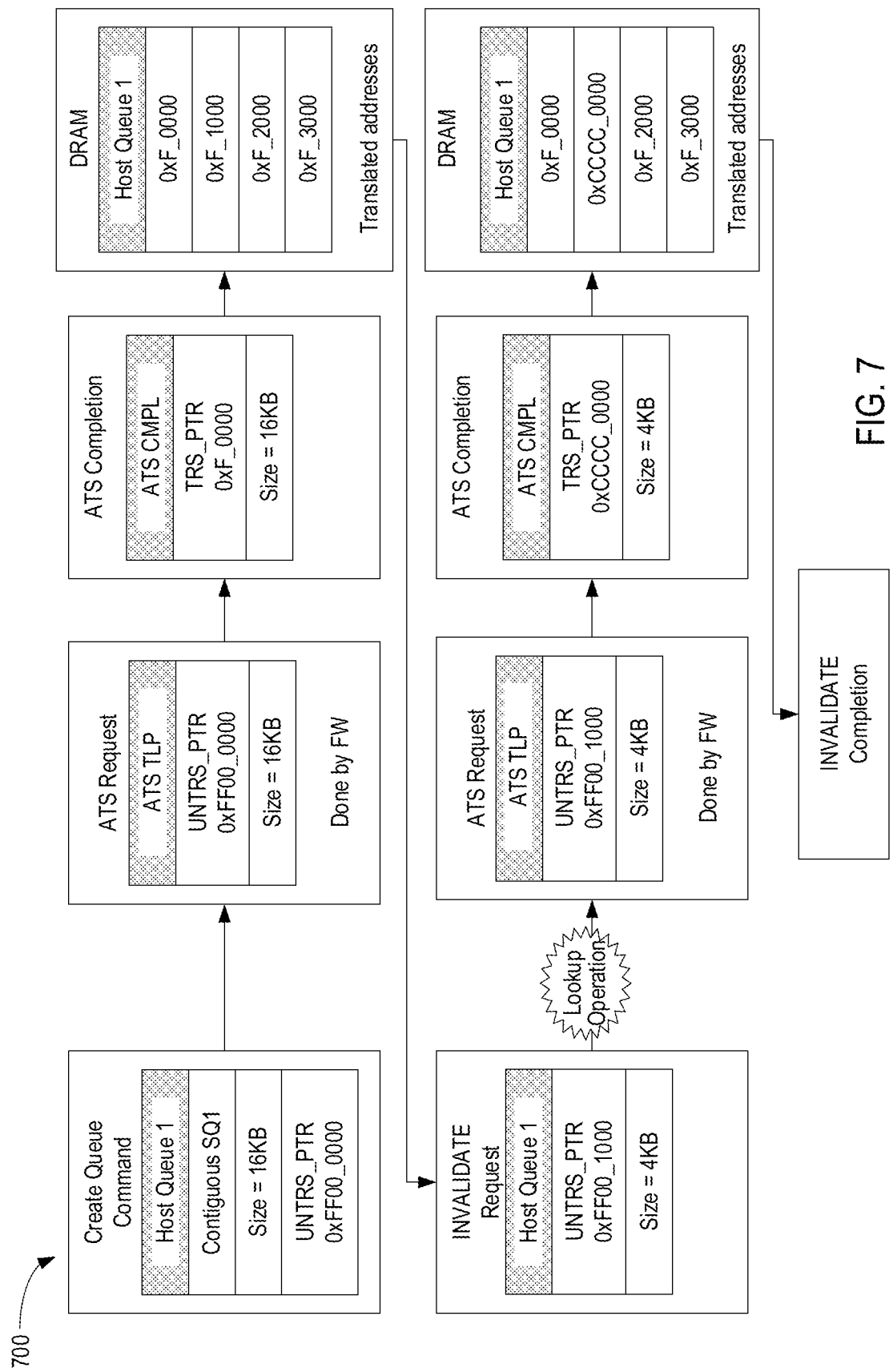
FIG. 7 is a block diagram illustrating a multi-tenancy system for ATS support for host queues, according to one embodiment.

FIG. 7 is a block diagram illustrating a multi-tenancy system 700 for ATS support for host queues, according to one embodiment. The host, such as the host 104 of FIG. 1, creates a contiguous internal operation (10) SQ. The size of the queue is 16 KB while the untranslated address is 0xFF00_0000. The create command queue is either a virtual address or untranslated pointer. Immediately after receiving the create queue command, the FW sends an ATS request to receive the translated address having the size of 16 KB. For example, the untranslated address is 0xF_0000 is contiguous to the entire 16 KB. The controller creates the queue internally while utilizing the non-contiguous feature even though the untranslated address is a contiguous queue. The controller further generates dummy pointers to represent the 16 KB queue. Using the non-contiguous feature simplifies the invalidate flow.

After the dummy pointers are generated, the host issues the invalidate request with the untranslated address of 0xFF00_1000 having a size of 4 KB. The controller first disables command fetching and performs a lookup operation in the untranslated addresses that were provided by the host when creating the queues. For example, a match is found so the FW sends an ATS request to receive the new translated address. The TA provides the new translated address of 0xCCCC_0000. The controller replaces the old translated address (0xF_1000) with the new translated address (0xCCCC_0000) to complete the invalidate request and re-enable command fetching.

The method of the system 700 beings with the host sending a create queue command to the ATS request. In this example, the create command queue is a contiguous SQ with a queue size of 16 KB. The create command queue is either a virtual address or untranslated pointer. Immediately after receiving the create queue command, the controller sends an ATS request with a size of 16 KB.

After some time, the controller will receive a completion from the address translation agent and in this completion the controller will receive the translated pointer or the physical pointer. In the current embodiment, the translated address size is 16 KB. There may be another embodiment where the controller receives pointers in the ATS completion because the ATS completion is not necessarily even, from the virtual point of view, the physical pointer is a single pointer. From a physical point of view, the physical pointer might be contiguous.

In another embodiment, the host may send the ATS completion several pointers, but in the current embodiment the host sends a single pointer with the physical address. The single pointer is stored in the DRAM and the DRAM describes the queue of the create queue command. The queue is described as a non-contiguous queue, and therefore the queue has four pointers as seen with the addresses. There is a separate pointer for each 4 KB of data since there are four pointers that describe the queue.

After some time, the host may send an invalidate request to the controller. The invalidate request will have an untranslated pointer with a size of 4 KB, for example. The controller does some housekeeping operation in the look up operation to make sure there is no overlap and detects if there is a match in the DRAM. If a match is detected, then the controller interacts with the ATS request in order to receive a new pointer. The ATS request has an untranslated pointer with a size of 4 KB. Eventually, after some time the controller will receive the completion.

Once the completion is received at the ATS completion, there will be a new translated pointer with the size of 4 KB. The controller will then go to the DRAM with the new translated pointer and replace the old address with the new physical address. The controller will send the invalidate completion to the host and the queue is ready for use again.

The non-contiguous structure is important because the logical domain in the virtual domain is a contiguous queue, but not necessarily in the physical domain. In other domains, the logical domain might be non-contiguous, and therefore the controller can prepare for the worst case. With the use of invalidate requests, the invalidate request can be for part of the queue, and not for the entire queue. Having the invalidate request a part of only part of the queue will simplify the invalidate flow when the controller just has to replace some pointers. Rebuilding the entire structure is avoided, but the structure will need to be rebuilt while using a non-contiguous queue.

Figure 8:
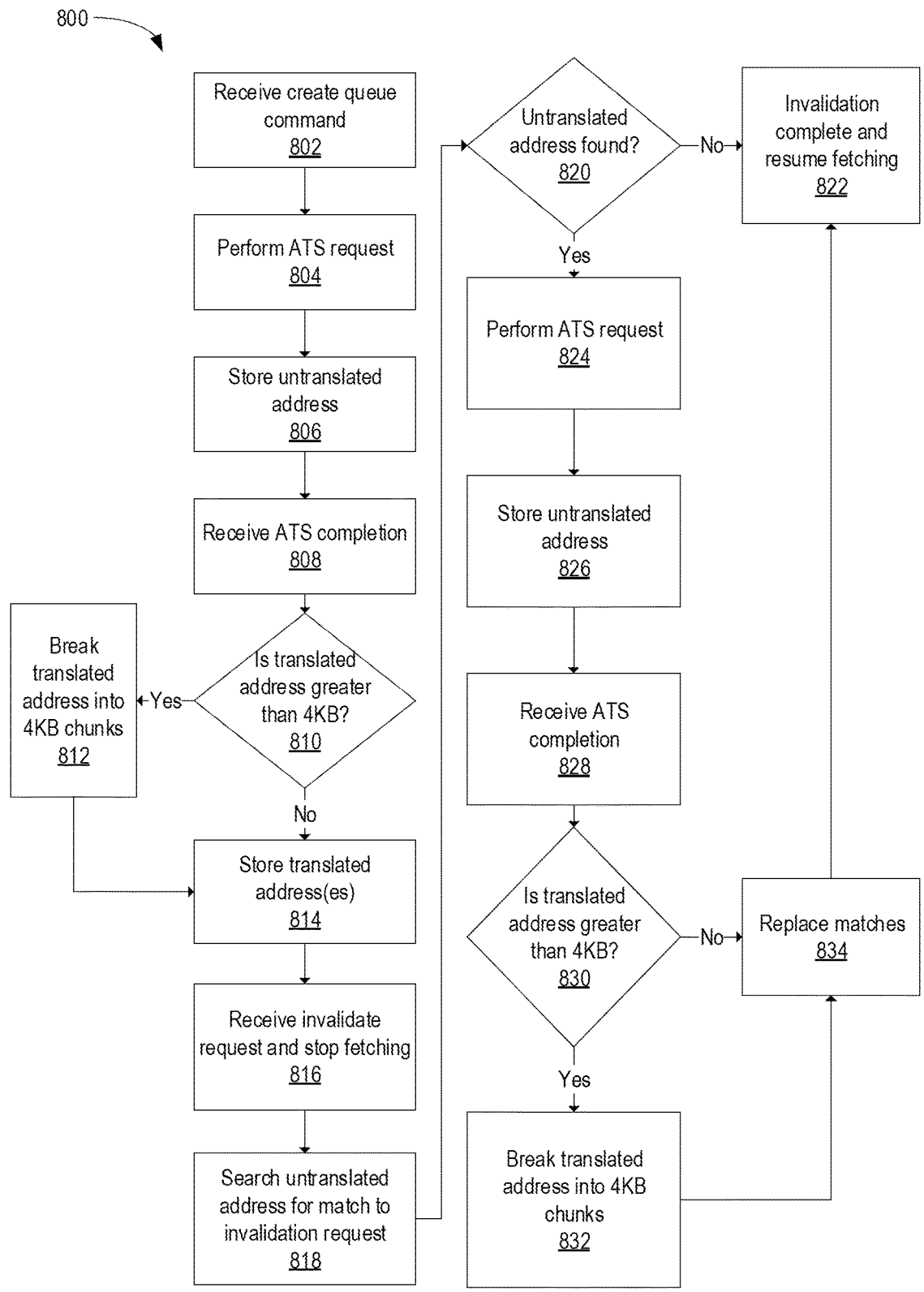
FIG. 8 is a flowchart illustrating a method for cache writing or direct writing a new zone, according to certain embodiments.

FIG. 8 is a flowchart illustrating a method 800 for ATS management for host queue pointers, according to certain embodiments. The method 800 begins at block 802. At block 802 the controller receives a create queue command. At block 804, the controller performs an ATS request. At block 806, the controller stores the untranslated address. At block 808, the controller receives the ATS completion. At block 810, the controller determines whether the translated address is greater than 4 KB. If the controller determines that the translated address is greater than 4 KB, then the method 800 proceeds to block 812. At block 812, the controller breaks the translated address into 4 KB chunks and proceeds to block 814. If the controller determines that the translated address in not greater than 4 KB, then the method 800 proceeds to block 814. At block 814, the controller stores the translated address. At block 816, receives an invalidate request and stops fetching. At block 818, the controller searches untranslated address for match to invalidation request. At block 820, the controller determines whether the untranslated address is found.

If the controller determines that the untranslated address is not found then the method proceeds to block 822. At block 822, the invalidation is complete and the controller resumes fetching. If the controller determines that the untranslated address is found then the method proceeds to block 824. At block 824, the controller preforms the ATS request. At block 826, the controller stores the untranslated address. At block 828, the controller receives the ATS completion. At block 830 the controller determines whether the translated address is greater than 4 KB. If the controller determines that the translated address is greater than 4 KB, then the method 800 proceeds to 832. At block 832, the controller breaks the translated address into 4 KB chunks and proceed to block 834. If the controller determines that the translated address is not greater than 4 KB, then the method 800 proceeds to block 834. At block 834, the controller replaces matches and returns to block 822.

The main advantages of ATS management of host queues is the simplicity and performance of invalidate flow. The invalidate flow is completed very fast using a very simple flow without increasing the size of the ATC.

In one embodiment, a data storage device comprises: a memory device; and a controller coupled to the memory device, wherein the controller is configured to: receive a create queue command; fetch queue untranslated address from a host device; perform address translation on the untranslated address to create translated addresses; create a non-contiguous queue using the translated addresses; and send a completion to the host device for the create queue command. The controller is configured to store the untranslated address and maintain storage of the untranslated addresses after the creating. The untranslated address are contiguous and wherein the translated address are non-contiguous. The non-contiguous queue contains the translated addresses in a 4 KB granularity and wherein the untranslated addresses have a granularity greater than 4 KB. The address translation occurs prior to the controller needing physical addresses for the untranslated addresses. The controller is configured to initiate fetching of pointers from the host device. The controller is configured to receive an invalidation request containing a new untranslated address. The untranslated address is a contiguous address, and wherein the new untranslated address corresponds to a portion of the untranslated address. The controller is configured to translate the new untranslated address to create a new translated address, and wherein the controller is configured to replace a first translated address of the translated address. The controller is configured to disable command fetching upon receiving the invalidation request, and wherein the controller is configured to re-enable command fetching after the replacing.

In another embodiment, a data storage device comprises: a memory device; and a controller coupled to the memory device, wherein the controller is configured to: receive an invalidate request; scan and compare all untranslated addresses to an address in the invalidate request; perform address translation on the address in the invalidate request to create a new translated address; and replace an old translated address with the new translated address. The controller is configured to disable command fetching in response to the receiving. The controller is configured to re-enable command fetching after the replacing. The all untranslated address were provided by a host device at a host creation queue time. The replacing occurs in 4 KB granularity. The replacing occurs in a queue and wherein the queue is a non-contiguous queue. The old translated addresses are stored in dynamic random access memory (DRAM).

In another embodiment, a data storage device comprises: means to store data; and a controller coupled to the means to store data, wherein the controller is configured to: translate untranslated addresses to create translated addresses, wherein the translated addresses are non-contiguous; search the untranslated addresses for a match in response to an invalidation request; and replace a translated address of the translated addresses with a newly translated address from the invalidation request. The translating occurs prior to physical addresses are needed, wherein the controller is configured to send a completion notification to a host device upon completing the replacing, and wherein the controller is configured to send a create queue completion notification to the host device upon completing the translating. The controller is configured to receive a create queue command having contiguous addresses and wherein the queue contains the translated addresses.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a create queue command;
fetch queue untranslated address from a host device;
perform address translation on the untranslated address to create translated addresses;
create a non-contiguous queue using the translated addresses; and
send a completion to the host device for the create queue command.

2. The data storage device of claim 1, wherein the controller is configured to store the untranslated address and maintain storage of the untranslated addresses after the creating.

3. The data storage device of claim 1, wherein the untranslated address are contiguous and wherein the translated address are non-contiguous.

4. The data storage device of claim 1, wherein the non-contiguous queue contains the translated addresses in a 4 KB granularity and wherein the untranslated addresses have a granularity greater than 4 KB.

5. The data storage device of claim 1, wherein the address translation occurs prior to the controller needing physical addresses for the untranslated addresses.

6. The data storage device of claim 1, wherein the controller is configured to initiate fetching of pointers from the host device.

7. The data storage device of claim 1, wherein the controller is configured to receive an invalidation request containing a new untranslated address.

8. The data storage device of claim 7, wherein the untranslated address is a contiguous address, and wherein the new untranslated address corresponds to a portion of the untranslated address.

9. The data storage device of claim 8, wherein the controller is configured to translate the new untranslated address to create a new translated address, and wherein the controller is configured to replace a first translated address of the translated address.

10. The data storage device of claim 9, wherein the controller is configured to disable command fetching upon receiving the invalidation request, and wherein the controller is configured to re-enable command fetching after the replacing.

* * * * *